United States Patent [19]
Strachan

[11] 3,737,752
[45] June 5, 1973

[54] MOTOR CONTROL SYSTEM
[75] Inventor: Richard W. Strachan, Attleboro, Mass.
[73] Assignee: Texas Instruments Incorporated, Dallas, Tex.
[22] Filed: Apr. 9, 1971
[21] Appl. No.: 132,846

[52] U.S. Cl. ............... 318/471, 318/221 E, 338/220
[51] Int. Cl. ............................................. H02p 1/44
[58] Field of Search ............... 318/471, 221 E, 221 R, 318/221 D, 229; 338/22, 23, 25, 204, 205, 220, 320

[56] References Cited
UNITED STATES PATENTS

| | | | |
|---|---|---|---|
| 3,227,983 | 1/1966 | Braun | 338/204 X |
| 3,303,402 | 2/1967 | Martin | 318/229 X |
| 3,544,869 | 12/1970 | Plouffe et al. | 318/229 X |
| 3,562,614 | 2/1971 | Gramkow | 318/221 E |
| 3,593,081 | 7/1971 | Forst | 318/229 |

Primary Examiner—B. Dobeck
Attorney—Harold Levine, Edward J. Connors, Jr., John A. Haug, James P. McAndrews and Gerald B. Epstein

[57] ABSTRACT

A system adapted for use in controlling an electric motor having a start winding, a run winding, and a capacitor connected to the start winding is disclosed in which a heat responsive current limiting device, the electrical resistance of which increases abruptly at a predetermined transition temperature, is connected in parallel relationship with the capacitor and coupled to the start winding so as to permit power to be supplied to the start winding therethrough only during starting of the motor until the predetermined transition temperature is approached whereupon power is applied to the start winding through the capacitor and the voltage established thereacross retains the heat responsive current limiting device in a heated state so that the device continues to block current flow therethrough until another starting cycle is initiated.

10 Claims, 3 Drawing Figures

Inventor
by Richard W. Strachan
Gerald B. Epstein Att'y

MOTOR CONTROL SYSTEM

The present invention relates generally to motor control systems and more particularly is directed to a device and system for controlling the power supplied to the windings of an electric motor.

In various types of electric motors such as single phase a.c. motors a pair of windings are typically employed connected in parallel relationship with each other and are commonly identified as the start winding and the run winding. Such motors typically require various types of starting systems including switching devices for energizing the windings as well as capacitors coupled to the windings in order to improve starting torque, effect smoother running, etc. Typically during starting of such motors the starting winding is energized as well as the main winding during the motor starting period, while the start winding is substantially deenergized as the motor approaches its running speed. Particularly in higher power versions of single phase a.c. motors it is often desirable to employ a so-called capacitor run motor system in which a run capacitor is provided serially connected to the start winding so that the start winding continues to make a torque contribution during the running of the motor as well as during the starting cycle. However, the size of the run capacitor in such situations is often optimized for motor running conditions so that starting torque may be relatively low and may present a formidable problem particularly in locations having poor starting conditions such as low line voltage, high line resistance, etc. Such situations have necessitated the provision of various types of switching devices, such as potential relays, and the like, as well as motor start capacitors selectively coupleable to the start winding in order to improve starting conditions. However, the provision of such devices has presented certain problems in view of the inherent unreliability of mechanical switching devices when exposed to the adverse environment associated with continual opening and closing of the contacts and the accompanying sparking and arcing. As a result rapid wear and degradation of the contacts occurs necessitating frequent replacement as well as presenting a potential danger of motor failure. Other types of elements have been proposed for use in the switching operations but particularly in view of the fact that the voltage developed across the capacitor may be more than twice the line voltage in some instances such suggestions generally have not met with a high degree of success. Other types of mechanical switching devices have been also utilized in certain instances such as various types of centrifugal switches which respond to motor speed, but such devices have been relatively unreliable in certain instances. For example, such devices are not particularly versatile and may not be used in certain applications such as in hermetically sealed motor constructions such as are commonly employed in refrigeration compressors.

Accordingly, it is an object of the present invention to provide an improved system adapted for use in controlling an electric motor.

It is another object of the present invention to provide an improved device adapted for use in controlling the starting of a single phase a.c. motor.

It is still another object of the present invention to provide an improved electric motor control system adapted for use with a capacitor run or capacitor start capacitor run a.c. motor in which the necessity for mechanical switching contacts for controlling the power applied to the start winding is eliminated.

It is a further object of the present invention to provide an improved system for use with an electric motor which system is extremely durable in use.

Various additional objects and advantages will become readily apparent from the following detailed description and accompanying drawings wherein.

In the following detailed description corresponding elements in the various views of the drawings are indicated by common reference numerals.

Figure 1:
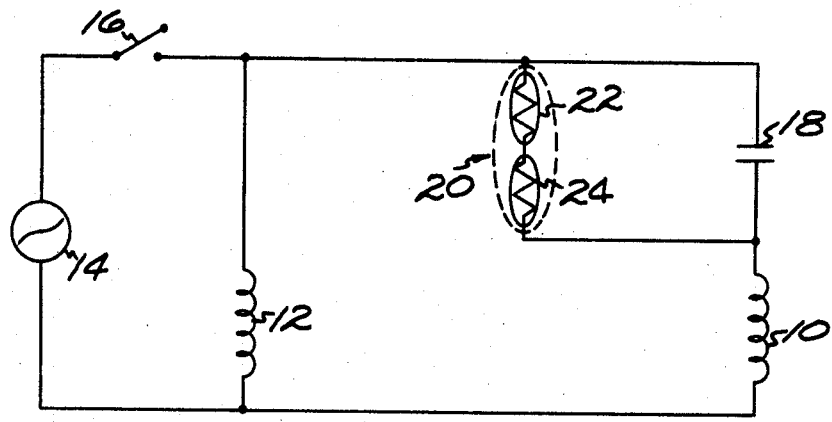
FIG. 1 is an electrical schematic circuit diagram of an electric motor starting system in accordance with the present invention.
Figure 3:
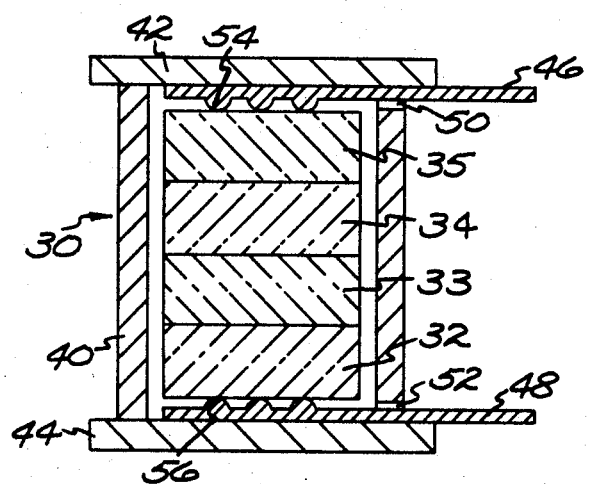
FIG. 3 is a vertical sectional view of a device utilized in the systems illustrated in FIGS. 1 and 2.

Very generally referring to the drawings and initially to FIG. 1 a single phase motor control system is illustrated including a start winding 10 and a run winding 12 connected in parallel relationship. The windings are energized from an a.c. power source 14 such as a 240 volt a.c. power supply through a conventional selectively operable switch 16 serially connected to the motor windings. In addition, a run capacitor 18 is provided connected to the start winding 10, as shown, in order to provide a capacitor run motor system. A heat responsive current limiting device 20 the electrical resistance of which increased abruptly at a predetermined transition temperature is connected in shunt relationship with the run capacitor 18, as shown, and is adapted to permit applied power to by-pass the run capacitor 18 during starting of the motor and to then permit power to be applied through the run capacitor as normal motor running speed is approached. The structural details of the device 20 are illustrated in FIG. 3 and will be explained in greater detail hereinafter.

In a system such as that illustrated in FIG. 1 the provision of the run capacitor 18 has been found to be quite useful in improving the operation of the motor during running, but may present a problem during the starting mode particularly when poor starting conditions are present such as low line voltage, high line resistance, etc. Accordingly, it is desirable to provide a suitable mechanism for effectively removing the run capacitor 18 from the system during starting of the motor when it is desired to energize the start winding 10 to a maximum extent. Such a mechanism may be provided by a potential relay, a centrifugal switch, etc. which by-passes the run capacitor 18 during starting of the motor until running speed is approached whereupon power is applied through the run capacitor in series with the start winding 10. However, the utilization of such mechanisms provide substantial difficulties in reliability as well as in proper operation and in accordance with the principles of the present invention the device 20 is provided.

The device 20 is illustrated schematically as comprising a plurality of resistance elements 22, 24 each possessing a resistance characteristic having a positive temperature coefficient and a sharply defined transition temperature above which the resistance of the element increases relatively abruptly, and are hereinafter referred to as PTC elements. Typical examples of such PTC elements may be fabricated of barium titanate doped with lanthanum. In the system illustrated in accordance with the present invention the PTC elements are employed to provide a switching device which is connected in parallel relationship with the run capacitor 18 for by-passing the run capacitor and permitting current 86 flow through the PTC elements 22, 24 to the start winding during starting of the motor for a predetermined time interval sufficient for the motor to approach running speed at which time the transition temperature of the PTC elements 22, 24 is approached causing the resistance thereof to increase rapidly thereby blocking continued current flow therethrough to thereupon permit the flow of current through the run capacitor 18 whereby capacitor-run motor operation is achieved. As shown the elements 22, 24 are connected in series relationship with each other and are preferably maintained in close heat transfer relationship with each other. Although only two PTC elements 22, 24 are illustrated it has been found in accordance with the present invention that a larger number of PTC elements such as three, four, etc. may be advantageously utilized in certain instances in order to effect satisfactory results. The feature of significance in this regard comprises the utilization of a plurality of PTC elements in a system such as that illustrated in that the use of a single PTC element under these circumstances has frequently resulted in system failure in view of the fact that the voltage developed across the capacitor 18 and hence across an element connected in shunt with the capacitor during normal running of the motor may approach values in excess of twice the line voltage. The continued establishment of a voltage level of such a magnitude across a PTC element may often result in structural failure of the PTC element after a very short time interval. However, the provision of a plurality of PTC elements, as illustrated, electrically connected in series relationship with each other and in thermal communication results in a unique configuration and substantially completely alleviates such problems. Although the exact mechanism by which such a success has been brought about is not fully understood in theory, it is presently believed that the provision of a plurality of PTC elements connected in series relationship with each other while being maintained in close thermal contact with each other, preferably in abutting physical contact, with each other results in the establishment of a uniform temperature gradiant and a distributed voltage drop across the elements.

A number of advantages reside in the provision of the serially connected PTC resistance elements 22, 24, as illustrated, in addition to those described hereinabove. For example, such a provision permits a substantially instantaneous current flow through the start winding 10 in response to closure of switch 16 upon motor starting prior to the time required for the PTC elements 22, 24 to reach their transition temperature which in turn effects greater starting torque. In addition, the provision of the PTC elements results in a larger resistance in parallel relationship with the start winding 10 and causes the power factor of the start winding to approach a value closer to unity so as to increase the phase difference between the start winding 10 and the run winding 12 to further increase motor starting torque. Still further a more reliable switching mechanism is provided during motor starting in which the problems commonly associated with the usage of mechanical contacts are essentially eliminated. If desired, in certain circumstances in order to modify the starting characteristics of the motor control system it may be also desirable to provide additional PTC element(s) connected in parallel relationship with the plurality of serially connected PTC elements 22, 24, although the desirability of employing such additional element(s) depends upon the starting conditions which are desired for particular applications. The flexibility of such a system is further enhanced by the ease with which additional PTC elements may be selectively added or removed from the system in order to accommodate various voltage and current conditions, as well as various capacitor provisions which may be desired. To briefly summarize operation of the system illustrated in FIG. 1, when the switch 16 is closed so as to cause the application of power to the start winding 10 and the run winding 12, the PTC elements 22, 24 are initially in an unheated state and permit a substantially unrestricted flow of current therethrough to the start winding 10, by-passing the run capacitor 18. As a result, smooth motor starting with a high starting torque is provided as the current flows through the PTC elements 22, 24 to the start winding 10; as motor running speed is approached after a predetermined time interval sufficient for the PTC elements 22, 24 to begin to self-heat and approach their transition temperature they begin to block current flow therethrough and the current is caused to flow through the run capacitor 18 as motor running speed is approached so as to provide for smoother running of the motor during normal running. In addition, the voltage established across the capacitor 18 during running of the motor is also established across the PTC elements 22, 24 so as to maintain these elements in a heated state such that current flow therethrough is prevented during running of the motor, thereby permitting desired operation of the run capacitor 18, and an extremely durable and efficient motor control system is provided.

Figure 2:
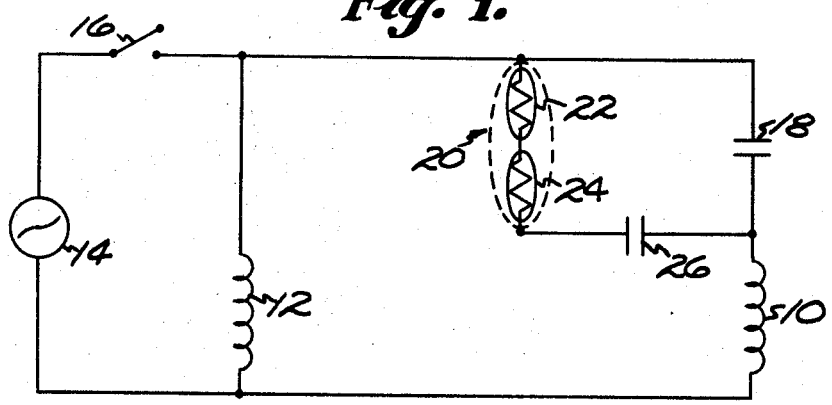
FIG. 2 is an electrical schematic circuit diagram of another embodiment of a system in accordance with the present invention.

In certain instances it may be desirable to provide a capacitor-start capacitor-run motor control system and such a system is illustrated in the alternative embodiment shown in FIG. 2. This embodiment is essentially similar to that illustrated in FIG. 1 but provides capacitor-start, capacitor-run operation. More particularly, this system also includes the a.c. power supply 14 which supplies operating power through the switch 16 to the parallel connected start winding 10 and run winding 12. The run capacitor 18 is similarly serially connected to the start winding 10, as shown, while the device 20 including the serially connected, thermally coupled PTC elements 22, 24 is connected in shunt across the run capacitor 18 and coupled to the start winding 10. However, in addition, a start capacitor 26 is provided serially connected between the PTC elements 22, 24 and the start winding 10, as shown. Operation of the embodiment illustrated in FIG. 2 is essentially similar to that shown in FIG. 1 and is as follows. Upon closure of switch 16 power is applied from the power supply 14 to the run winding 12 and to the start winding 10. Initially, since the PTC elements 22, 24 are in an unheated or cold state these elements are in their low resistance mode and serve to by-pass the run capacitor 18 with which they are connected in shunt relationship and hence apply current to the start winding 10 through the start capacitor 26 which is serially connected between the PTC elements 22, 24 and the start winding 10. As a result a substantial starting torque is provided in view of the phase shift between the start winding 10 and the run winding 12 provided by the start capacitor 26. After a predetermined time interval sufficient for motor starting the current flow through the PTC elements 22, 24 causes self-heating and as their resistance increases they block current flow therethrough and cause current to be applied to the start winding 10 through the run capacitor 18, and effectively remove the start capacitor 26 from the circuit. Accordingly, during normal running of the motor the run capacitor 18 remains serially connected to the start winding 10 and the voltage established thereacross maintains the PTC elements 22, 24 in their heated or current blocking state to maintain the start capacitor 26 inoperative during running of the motor. If capacitor-start operation is desired the run capacitor 18 may be deleted from the FIG. 2 embodiment with the device 20 and the start capacitor 26 remaining serially connected to start winding 10. Referring to FIG. 3, a vertical sectional view of a device indicated generally by the reference numeral 30 is shown comprising the device 20 illustrated schematically in FIGS. 1 and 2. The device 30 is generally representative of a typical example of a device of this type which has been constructed and includes four PTC elements 32, 33, 34 and 35 which in the illustrated embodiment comprise generally flat, thin circular discs of a suitable material, such as lanthanum doped barium titanate. The PTC elements 32–35 are each preferably provided with a suitable conductive coating on their flat outer surfaces of a suitable material, such as aluminum, copper aluminum, electroless plated nickel, etc. so as to facilitate the provision of electrical connections between adjacent elements or to facilitate the provision of an electrical connection between an element and external electrical elements. In the illustrated embodiment the four PTC elements are disposed in axially aligned contiguous relationship with one another to facilitate the desired heat transfer relationship as well as the series electrical connection therebetween. The elements 32–35 are shown disposed within a suitable housing 40, the housing 40 being illustrated as a tubular member which is preferably open at its opposed ends to facilitate the insertion of the elements therein, these ends being subsequently closed by the provision of suitable end caps 42, 44 which are suitably bonded into position at the opposed ends of the housing 40. The housing 40 is preferably fabricated of a suitable heat resistant refractory material such as a suitable ceramic. Typical examples of such materials comprise steatite, beryllia, porcelain, etc. The end caps 42, 44 may be formed of a similar material or, if desired, may be formed of a suitable plastic material able to withstand the heat generated within the housing. In addition, suitable electrical contact members 46, 48 perferably comprising thin elongated conductive members are provided at opposed ends of the housing 42 and are maintained in electrical contact with each of the respective PTC elements at the respective ends of the axially aligned elements. In the illustrated embodiment the electrical contact member 46 is in electrical contact with the element 35, while the electrical contact member 48 is maintained in electrical contact with the PTC resistance element 32 disposed at the opposite end of the axially aligned PTC elements. Thus, a series electrical connection is provided between the PTC resistance elements and the electrical contact members 46, 48. The electrical contact members 46, 48 are received within the housing 40 by the provision of a pair of slots or apertures 50, 52. The electrical contact members 46, 48 extend from a point external to the housing 40 into the interior thereof through the slots 50, 52 so as to permit electrical contact to be made between the contact members and the PTC elements. In addition, the slots 50, 52 preferably are of a size slightly larger than the electrical contact members so as to provide venting passages to permit the circulation of the ambient air environment within the interior of the housing 40 since it has been found generally advantageous to permit the free circulation of air in an environment in which PTC elements, such as those illustrated are disposed in order to maintain optional performance characteristics. The contact members 46, 48 are preferably formed of a suitable conductive material such as beryllium copper and may be tin plated in order to further facilitate the making of good electrical contact thereto. In addition, the inwardly extending end surfaces of each of the contact members 46, 48 are preferably respectively provided with a plurality of protrusions 54, 56, as shown, extending toward and in contact with the conductive surfaces of the PTC elements 35, 32 positioned at the respective ends of housing 40 in order to further enhance the provision of a good electrical contact between the exposed surfaces of the respective PTC resistance element and the electrical contact members. Furthermore, the protrusions 54, 56 aid in maintaining the PTC resistance elements 32–35 in their proper axial orientation as well as maintaining them in tight fitting abutting relationship with respect to each other so as to provide a snug fit and to enhance the durability of the device 30. The outwardly extending ends of the electrical contact members 46, 48 are adapted to be connected in an electrical circuit such as that illustrated in FIGS. 1 and 2 across the run capacitor and coupled to the start winding 10. Of course, it may be readily appreciated that various alternative housing designs may be utilized other than the tubular configuration illustrated, and similarly a plurality of PTC elements other than the number illustrated may be shown serially connected to each other and maintained in heat transfer relationship with one another. Furthermore, if desired, the PTC elements within the housing may be oriented in other physical configurations as long as they are maintained serially electrically connected and in heat transfer relationship with one another. Still further, if desired, a plurality of additional PTC resistance elements may be provided within the housing connected in parallel with the PTC elements shown in order to vary the resistance characteristics of the device.

Thus, a unique device and motor control system have been described in detail. Various additional changes and modifications may be made in the above-described embodiments without departing from the spirit and scope of the present invention as defined in the appended claims.

I claim:

1. A system adapted for use with an electric motor having a start winding, a run winding and a capacitor serially connected to the start winding, comprising a heat responsive current limiting device, said heat responsive current limiting device comprises a plurality of individual elements of preselected material each possessing a resistance characteristic having a positive temperature coefficient including a sharply defined transition temperature above which the resistance of the material increases abruptly, said individual elements being respectively mounted in adjacent facing relationship with one another and being electrically coupled and in thermal communication with one another, said heat responsive current limiting device being connected in parallel relationship with the capacitor and coupled to the start winding, and means for connecting said heat responsive current limiting means to a source of electrical power and to the start winding so as to permit power to be supplied to the start winding through said heat responsive current limiting device only during starting of the motor until the predetermined transition temperature is approached whereupon power is applied to the start winding through the capacitor and the voltage established thereacross retains said heat responsive current limiting device in a heated state.

2. A system in accordance with claim 1 wherein a series of said elements are mounted in axially aligned contiguous relation and electrically connected in series relationship with one another.

3. A system in accordance with claim 2 wherein a housing comprising a tubular member of heat-resistant, refractory material is provided for supporting said elements and electrical contact members are provided extending from a point external of said housing and through the wall of said housing, said electrical contact members being in electrical contact with conductive surface portions of said individual elements disposed at opposed ends of said tubular member.

4. A system in accordance with claim 3 wherein end caps of heat-resistant refractory material are disposed at opposed end edges of said tubular member for enclosing said housing and a slot is provided in the wall of said housing defining a vent passage to permit circulation of ambient air within said housing.

5. A system in accordance with claim 4 wherein a plurality of vent slots are provided and said electrical contact members extend into said housing through said vent slots.

6. A system in accordance with claim 1 wherein said elements comprise a plurality of positive temperature coefficient of resistance thermistors electrically connected in series relationship and physically positioned in contiguous heat transfer relationship with each other.

7. A motor control system for use with an electric motor having a start winding and a run winding comprising a run capacitor connected in series relationship with said start winding, a plurality of serially connected thermistors each having a positive temperature coefficient of resistance and arranged in heat transfer relationship with one another, said plurality of serially connected thermistors being connected in shunt relationship with said run capacitor and coupled to said start winding for supplying current to said start winding for a predetermined time interval during starting of the motor while bypassing said run capacitor and substantially blocking current flow therethrough and causing current to be supplied to said start winding during running of the motor subsequent to the predetermined time interval, and means for connecting the run winding, the start winding, said run capacitor and said plurality of thermistors to a source of electrical power.

8. A motor control system in accordance with claim 7 wherein said plurality of thermistors are mounted in contiguous heat transfer relationship with each other.

9. A motor control system in accordance with claim 7 wherein a start capacitor is provided connected in series relationship with said plurality of serially connected thermistors and in series relationship with the start winding for shifting the phase of current being supplied to the start winding while current is being supplied thereto through said thermistors during starting of the motor.

10. A motor control system in accordance with claim 9 wherein said plurality of thermistors are respectively mounted in abutting physical relationship with each other and maintained in closely coupled heat transfer relationship with each other.

* * * * *